United States Patent [19]

Musy

[11] 4,402,356

[45] Sep. 6, 1983

[54] TIRE FOR HEAVY TRANSPORT VEHICLES, THE CROWN REINFORCEMENT OF WHICH HAS THERMOCONTRACTABLE CIRCUMFERENTIAL CABLES AND PROCESS FOR MANUFACTURING SAME

[75] Inventor: Jacques Musy, Clermont-Ferrand, France

[73] Assignee: Compagnie Generale des Etablissements Michelin, Clermont-Ferrand, France

[21] Appl. No.: 346,129

[22] Filed: Feb. 5, 1982

[30] Foreign Application Priority Data

Feb. 12, 1981 [FR] France .............................. 81 02787
Dec. 23, 1981 [FR] France .............................. 81 24262

[51] Int. Cl.³ ............................................. B60C 9/00
[52] U.S. Cl. ................................... 152/193; 57/244; 57/902; 152/200; 152/209 R; 152/356 R; 152/359; 152/361 R; 152/361 DM; 156/123; 244/103 R; 264/230; 264/315; 264/326

[58] Field of Search ....... 152/356 R, 352 R, 361 DM, 152/361 R, 353 R, 354 R, 359, 209 R, 209 D, 193, 200; 156/110 R, 110 C, 123 R, 124; 428/295, 902, 913; 244/103 R; 57/243, 244, 902; 264/315, 326, 342 R, 230

[56] References Cited

U.S. PATENT DOCUMENTS 3,643,723  2/1972  Mukai .......................... 152/361 DM
3,735,791  5/1973  McKissick et al. ................. 152/352
4,258,773  3/1981  de Saint-Michel ......... 152/354 R X Primary Examiner—William A. Powell
Assistant Examiner—Thomas Bokan
Attorney, Agent, or Firm—Brumbaugh, Graves, Donohue & Raymond

[57] ABSTRACT

A tire, particularly for aircraft, has a crown reinforcement formed of plies of circumferential cables having a relative extensibility upon rupture of at least 8%, preferably between 10% and 26%, when the vulcanized tire is mounted on its service rim but not yet inflated, and a relative contraction under the effect of the heat at the temperature of vulcanization of at least 1.25%, preferably between 2% and 8%.

16 Claims, 5 Drawing Figures

U.S. Patent   Sep. 6, 1983   Sheet 1 of 2   4,402,356
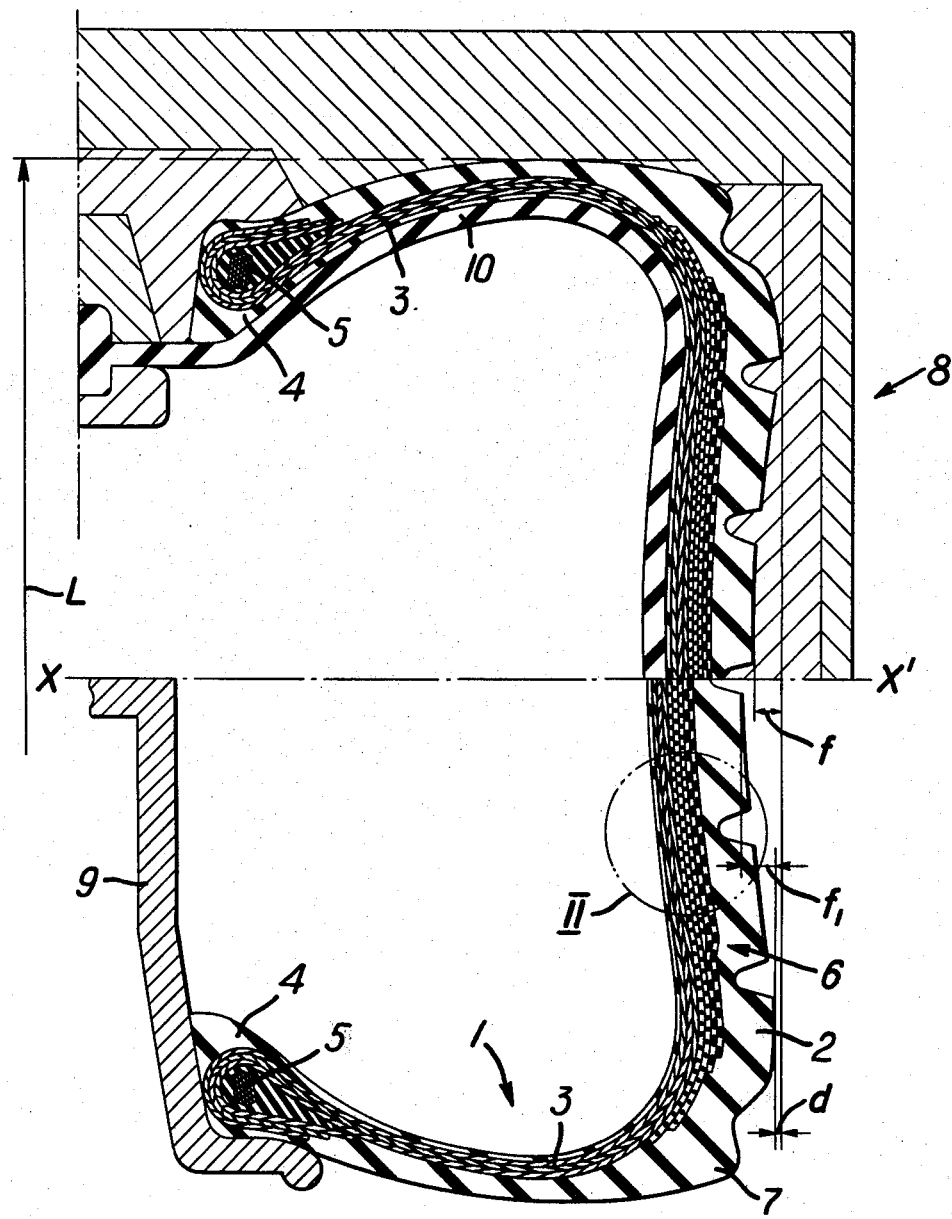
FIG. 1A
FIG. 1B
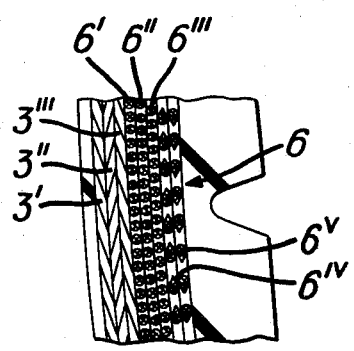
FIG. 2
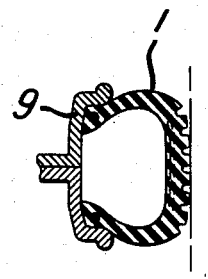
FIG. 3

TIRE FOR HEAVY TRANSPORT VEHICLES, THE CROWN REINFORCEMENT OF WHICH HAS THERMOCONTRACTABLE CIRCUMFERENTIAL CABLES AND PROCESS FOR MANUFACTURING SAME

The present invention concerns tires with radial carcass reinforcement intended to support heavy loads and inflated to relatively high pressures, particularly tires for aircraft.

In order optimally to absorb the circumferential tensions, particularly those produced by the high inflation pressures, the crown reinforcement of such tires may have superposed plies of circumferential cables. Whereas the radial cables of the carcass reinforcement are at their optimal orientation for absorbing the meridian tensions, experience shows that the circumferential cables of the crown reinforcement which are closest to the carcass reinforcement undergo compressions which are harmful to the life of the tires. These compressions come from the substantial deformations of the tire upon travel, since the tires in question generally are subjected to a crushing greater than that of ordinary tires despite the use of higher inflation pressures.

The object of the invention is to avoid the placing under compression of the circumferential cables which are closest to the carcass reinforcement of tires of the type described above without resulting in excessive wear of the tread.

In order to achieve this purpose, the invention contemplates that the cables of the circumferential cable plies have a relative extensibility upon rupture of at least 8%, preferably between 10% and 26%, when the vulcanized tire is mounted on its service rim but not yet inflated, and a relative contraction under the effect of the heat at the temperature of vulcanization of at least 1.25%, preferably between 2% and 8%.

The use of circumferential cables which are sufficiently extensible under the effect of the inflation pressure in order that the deformations of the tire in service never succeed in placing them in compression causes an excessive increase in the radial curvature of the tread when the tire is mounted on its service rim and inflated to its service pressure. Such an increase in radial curvature is prejudicial to the wear of the tread, in particular in the median zone of the tread. This is the reason why the invention contemplates using circumferential cables which are extensible and thermocontractable, i.e., manufactured of materials which contract under the effect of the heat at the temperature of vulcanization.

Textile materials are already known, such as polyamides or polyesters, which, when subjected to suitable treatments which are also known, make it possible to manufacture cables having, on the one hand, a relative contraction under the effect of the heat at the temperature of vulcanization of at least 1.25%, preferably between 2% and 8%, and, on the other hand, a relative extensibility upon rupture of at least 8%, preferably between 10% and 26%. Generally, the materials which give cables having the smallest extensibility upon rupture show the highest contraction under heat. In the present state of the knowledge of these materials, the upper limits of relative contraction and relative extensibility scarcely exceed 8% and 26%, respectively, but the principle of the invention extends to cables in which the limits are higher than those indicated above.

When a tire in accordance with the invention is removed from the mold in which it has been vulcanized, the tension in the circumferential cables of the crown reinforcement which has been induced by the heat at the temperature of vulcanization causes a decrease in the radial curvature of the crown and therefore of the outer surface of the tread of the tire mounted on its service rim but not yet inflated as compared with the curvature of the crown of the tire in the mold. By decrease in curvature there is understood the evolution of the vulcanization curvature of the outer surface of the crown towards a smaller or negative zero-pressure curvature if the initial or vulcanization curvature is positive or zero, that is to say if the crown is convex towards the outside of the tire or cylindrical, or towards a higher negative curvature in absolute value if the initial or vulcanization curvature is negative, that is to say if the crown is concave towards the outside. Stated differently, the equatorial vulcanization radius of the crown measured at the surface of the tread is greater than this same equatorial radius at zero pressure. When the tire is inflated to its service pressure, the zero-pressure curvature of the crown evolves from a negative curve towards a smaller negative curve in absolute value, towards a zero curve, or towards a positive curve, or from a positive curvature towards a positive curvature higher in absolute value. In all cases, the equatorial diameter of the surface of the tread at zero pressure increases upon inflation to the service pressure. As can be seen, the invention makes it possible to regulate the meridian profile of the tread surface in order to obtain optimal resistance to wear without jeopardizing the lefe of the circumferential cables of the crown reinforcement. By circumferential cables there are understood cables forming an angle of zero or an angle differing by at most ±2.5° from the circumferential direction of the tire.

The use of tires in accordance with the invention having a strongly concave tread surface (strongly negative curvature) before inflation has proved advantageous in particular for airplane tires, since it does away with the risk of placing the circumferential cables closest to the carcass reinforcement under compression. The invention makes it possible to obtain tires whose tread surface in inflated condition has a camber of concavity at least 10% greater than that of the mold. By camber of concavity there is understood the difference in the radii of the tread surface measured at the points of the shoulders furthest from the axis of rotation of the tire and at the equator of the tread surface when the tire is mounted on its service rim but not yet inflated. In this case, the invention has an additional special advantage, that is to say it solves a problem specific to the type of tire in question when the tread surface has a pronounced concavity. As a matter of fact, if such a tire whose crown reinforcement comprises plies with circumferential cables is vulcanized in a mold having a crown surface with a corresponding substantial concavity, the architecture of the crown undergoes greater disorganization the higher the camber of concavity. In the crown of an unvulcanized tire of the type in question, the positions of the cicumferential cables of the crown reinforcement are very sensitive to the variations in curvature caused by the shaping and then the molding of the crown. From this there result accumulations, both undesirable and uncontrollable, of the circumferential cables in certain regions of the crown as well as disorganized spacings of the radial cables of the carcass reinforcement and hence insufficient life of the crown.

The invention, therefore, in this case has the merit of remedying the disorganization of the circumferential cables of the crown reinforcement described above by proposing a method of manufacture which makes it possible to obtain tires of high concavity of the crown and of the tread, respectively, with a mold whose crown surface is cylindrical or slightly concave.

From French Pat. No. 2,057,798, (which corresponds to U.S. Pat. No. 3,735,791) it is known that a tire with radial carcass reinforcement can be vulcanized in a mold whose surface radius at the equator is smaller than that of the tire when mounted and inflated. The purpose of such a method is to improve the adherence and resistance to wear of the tread of highway tires. This is why the difference in equatorial surface radii is about 1 mm. The crown reinforcement of this tire does not have plies of circumferential wires. Upon travel, the wires of the plies are therefore not subjected to harmful compressive stresses. These wires furthermore will not be disarranged during the molding of the tire since in this patent the difference between the surface radii at the shoulders and at the center is small.

Furthermore, French Pat. No. 2,446,193 describes an airplane tire which has a radial carcass reinforcement and a crown reinforcement as well as a normally convex crown surface. The wires of the crown plies consist of aromatic polyamide. In order to avoid ruptures of the wires of the outer plies, these wires have larger relative elongations than the wires of the inner plies. The wires of the outer plies may be of aliphatic polyamide. Due to the necessarily very high relative elongations of these wires, these wires are either of small titer, or of high twist. The contraction stresses which they are capable of developing during the vulcanization are therefore insufficient to affect the subjacent crown plies whose cords are insensitive to the heat of vulcanization.

In general, the invention makes it possible to manufacture tires, the camber of concavity of the tread surface of which (as defined above) in the mold, considered in radial section, the vulcanization chamber or bag being under pressure, differs by at least 10% from the camber of concavity of the tread surface of the same tire when the pressure in the vulcanization chamber or bag is reduced to zero or the tire is mounted on its service rim but not yet inflated. Thus the invention makes it possible to manufacture tires, the camber of concavity of the tread surface of which in the mold (under pressure) differs by more than 25% and even more than 50% or 100% from the camber of concavity at zero pressure.

Another advantage of the method of manufacture in accordance with the invention resides in the fact that it facilitates the removal of the tire from the mold. As a matter of fact when, before the opening of the mold, the pressure is eliminated in the vulcanization chamber or bag arranged on the inside of the tire, the contraction of the circumferential cables of the crown reinforcement causes the contraction of the crown and the freeing of the outer surface of the crown from the elements in relief on the crown surface of the mold.

The tire in accordance with the invention when mounted on its service rim but not inflated is recognized therefore by the fact that it has a tread surface which is contracted in radial direction, that is to say smaller, than in the position of the tread in the mold whose vulcanization chamber or bag is under pressure. The amount of contraction at any point of the tread surface of the tire is at least equal to 1% of the corresponding radius of the corresponding mold surface measured with reference to the axis of rotation of the tire.

The plies of circumferential cables in accordance with the invention extend axially at least between the two shoulders of the tread. It is advantageous that the plies of circumferential cables have as known per se axial widths which decrease radially towards the outside. The axially widest circumferential cable ply can extend from one edge to the other of the tread. By thus decreasing the axial widths of the circumferential cable plies there is obtained a density of cables which decreases towards the edges of the tread. The median zone of the tread contracts more than the edges and increases the concavity of the crown of the still uninflated tire. For this purpose, one can also use, at least for the axially widest ply, cables having a relative contraction under the effect of the heat at the temperature of vulcanization which is less than that of the cables of the other plies of circumferential cables.

One variant of the invention, which is preferred since it makes it possible to exert a positive influence on the resistance to drift of the tires of the invention, consists in having at least two oblique crown plies of cables which are parallel in each ply and crossed from one ply to the next, forming angles of between 30° and 90° with respect to the circumferential direction of the tire, cooperate with the plies of circumferential cables.

The cables of these oblique plies are also extensible and thermocontractable. It is advantageous to employ cables having a low relative extensibility upon rupture and a high relative contraction under the effect of the heat at the temperature of vulcanization as compared with the extensibility and contraction of the cables of the circumferential cable plies. Preferably, the relative extensibility upon rupture is smaller as the angle formed by these cables with the circumferential direction is larger and closer to 90°. The crossed oblique plies are furthermore arranged radially to the outside of the circumferential plies. Their contraction under the effect of the heat at the temperature of vulcanization produces a transverse shortening of the radially outer elements of the crown reinforcement. Hence an increase in the concavity of the crown surface of the still uninflated tire is added onto the concavity produced by the contraction of the circumferential cable plies.

Preferably furthermore the cables of the radial carcass reinforcement are inert, i.e., practically without extensibility and contraction under the effect of the heat at the temperature of vulcanization: they consist, for instance, of steel, glass or aromatic polyamide.

One then benefits fully from the thermocontractivity of the crown reinforcement in accordance with the invention. However, one may also use extensible and thermocontractable cables for the radial carcass reinforcement, for instance, in order to decrease the weight and/or the price thereof. On the one hand, such a radial carcass reinforcement makes it possible to reduce the increase in concavity of the crown and of its surface which is caused by the plies of the crown reinforcement. On the other hand, it is sufficient to increase the number of circumferential cables of the crown reinforcement, particularly in the median portion, in order to neutralize the opposing effect of the extensible, thermocontractable cables of the radial carcass reinforcement.

Under certain conditions of travel, particularly at high speed, the crown reinforcement of the invention may be damaged by objects (stones, metal parts lost by vehicles, etc.) which lies on the path of the tire.

Due to the large amount of expansion of the crown of the tire under the effect of the inflation, it is not always possible to use a screen of ordinary elastic cables. The extensibility of these cables is insufficient. The expansion of the crown in accordance with the invention is of such amount that these cables would lose their fundamental properties. They could no longer serve as protectors and would contribute to undesirably reinforcing the crown reinforcement.

It thus falls within the scope of the invention to have at least one ply of cables which are undulated in the plane of the ply cooperating with the crown reinforcement in accordance with the invention. This ply is arranged radially outwards of the crown reinforcement. Its properties neither interfere with the unusual expansion of the crown nor reinforce the latter undesirably.

For this purpose, the distance from one cable to the next is between 50% and 100% of the crest-to-crest amplitude of the undulations, the wavelength of the undulations being between 100% and 200% of the crest-to-crest amplitude; the cables are parallel in the ply, that is to say the undulations are in phase; the mean axes of the undulations of the cables are oriented preferably at 0° or 90° with respect to the circumferential direction of the tire. This preference does not exclude the use of at least one ply of undulated cables whose mean axes extend obliquely with respect to the circumferential direction.

This ply can also be formed of a mesh of cables obtained, for instance, by simply crossing the undulations. In this case, the distance of one cable from the next is at most equal to the crest-to-crest amplitude of the undulations of the wires. The elasticity of the fabric increases when the distance between the cables decreases.

The drawing and the portion of the specification which relate thereto illustrate one embodiment of the invention. In this drawing, which is schematic and not to scale:

FIGS. 1A and 1B show a tire in accordance with the invention in radial semi-section, namely, in a vulcanization mold having a concave crown surface and with vulcanization chamber or bag under pressure in FIG. 1A, and on its service rim but not yet inflated in FIG. 1B;

FIG. 2 is a view on a larger scale of the part of the tire crown inscribed within the circle II in FIG. 1;

FIG. 3 is a view in reduced size of the tire shown on its rim and inflated to its service pressure but not loaded.

Figure 4:
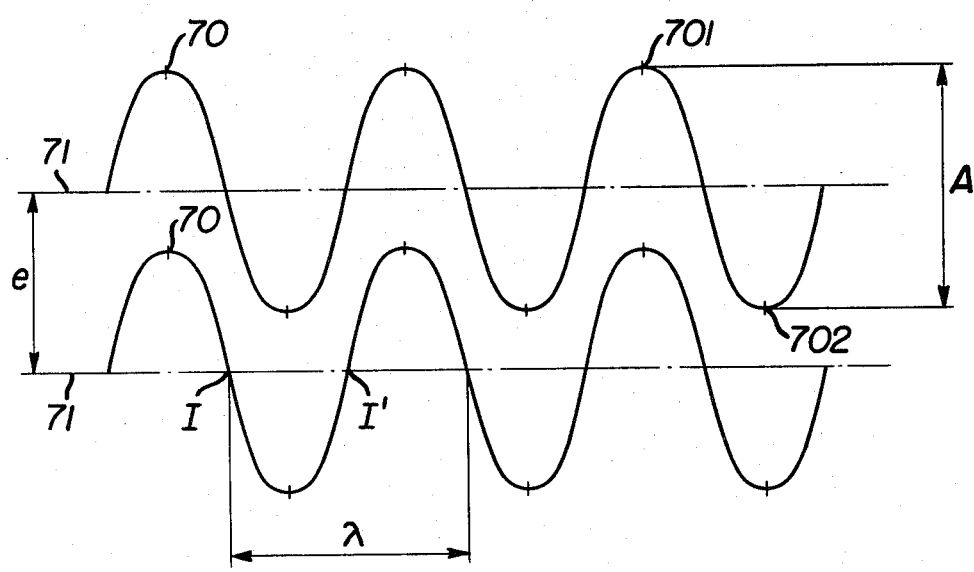
FIG. 4 shows schematically a portion of the protective ply of such a tire.

The aircraft tire 1 illustrated in FIGS. 1 to 3 corresponds to the commercial size 750×230-15. It has a tread 2, a radial carcass reinforcement 3 anchored in each bead 4 by turning around a bead ring 5, and a crown reinforcement 6 arranged radially outwards of the radial carcass reinforcement 3. The composition of this crown reinforcement 6 is shown in detail in FIG. 2.

The crown reinforcement 6 (FIG. 2) comprises, on the one hand, three plies 6', 6'', 6''' of aliphatic polyamide cables of 188×2×2 tex having an elongation of about 22% before rupture under a force of 60 daN; under the effect of heat at the temperature of vulcanization these cables contract by 6 to 7%. In each of these three plies 6', 6'', 6''', the cables are oriented circumferentially. The ply 6''' which is located radially outwards of the other two plies 6', 6'' has a width of 108 mm while the plies 6' and 6'' have a width of 214 mm and 212 mm, respectively, and extend up into the shoulders 7 of the tire.

The crown reinforcement 6 (FIG. 2) furthermore has, outwards of the plies 6', 6'' and 6''', two plies $6^{iv}$ and $6^v$ of aliphatic polyamide cables of 94×3 tex having about 22% elongation before rupture under a force of 15 daN; under the effect of heat at the temperature of vulcanization, these cables contract by 3 to 5%. In each of these two plies $6^{iv}$, $6^v$, the cables form an angle of 60° with the circumferential direction of the tire; they are crossed from one ply to the next. The ply $6^{iv}$ has a width of 155 mm; the ply $6^v$ has a width of 152 mm.

In the embodiment illustrated in the drawing, the radial carcass reinforcement 3 is composed of three plies 3', 3'', 3''', each comprising, per centimeter of width, twelve aliphatic polyamide cables of 188×2 tex, having about 24% elongation before rupture under a force of 28 daN; under the effect of heat at the temperature of vulcanization these cables contract by about 5%.

In a variant embodiment, not shown in the drawing, the radial carcass reinforcement is composed of two plies each having, for each centimeter of width, eleven cables of aromatic polyamide of 167×2 tex having about 3.9% elongation before rupture under a force of 48 daN; these cables do not contract under the effect of heat.

For these two embodiments, the mold 8 used to vulcanize the tire 1 is the same. The cavity of this mold has a maximum axial width L and a camber of concavity of the crown surface f equal to $(L \times 1.76)/100$. In this example, f is equal to 4.25 mm. The vulcanization bag 10 is under pressure.

Comparing FIG. 1A with FIG. 1B, it is seen that when the tire which has been removed from the mold 8 is mounted on its service rim 9 but is not yet inflated, the radial curvature of the surface of its tread 2 with its crown reinforcement 6, measured at the equator, that is to say in the median plane X-X', has substantially increased (FIG. 1B) due to the tension produced in the cables of the crown reinforcement 6 by the heat of vulcanization. Even though the surface of the crown of the mold 8 is slightly concave (camber of concavity f=4.25 mm, FIG. 1A), the crown surface of the tire 1 after removal from the mold 8 but before inflation on its service rim 9 assumes a more accentuated concavity (camber of concavity $f_1=5.75$ mm, FIG. 1B) than in the mold. In the zone of the shoulders 7, the contraction d with respect to the radius of the crown surface of the mold 8 in this same region is about 4.1%, while in the equatorial zone the contraction ($f_1$-f+d) referred to the radius of the crown surface of the mold in the median plane X-X' is about 4.6%.

When the tire in accordance with the variant not shown in the drawing is removed from the vulcanization mold, mounted on its service rim but not yet inflated, the radial curvature of the surface of its tread with its crown reinforcement, measured at the equator, has increased more than in the case of the tire having a three-ply radial carcass reinforcement such as described above. The camber of concavity, which was equal to f=4.25 mm in the mold, has in fact increased to $f_1=9.25$ mm for the tire mounted on its service rim but not yet inflated.

In the above two examples, the crown surface of the tire inflated to its service pressure, due to the extensibility of the cables of the crown reinforcement, has assumed a slightly convex shape, as shown in FIG. 3.

A very extensible protective screen was developed in accordance with the scheme of FIG. 4 for a tire for airplanes of size 46×16-20. For this purpose, a ply of undulated cables 70 of 1 mm in diameter formed of nine steel wires of 23/100 mm in diameter was used. The undulations are sinusoidal, with an amplitude A from crest 701 to crest 702 of 5 mm and a wavelength λ of 5 mm. The spacing e of the parallel cables 70, that is to say the cables in phase, is 3.5 mm. The mean axes 71 of the undulations are directed at 90° to the circumferential direction (not shown).

FIG. 4 is a partial representation of two adjacent cables 70 of this screen-ply. The spacing e of the cables is equal to the distance between the mean axes 71 of two undulations. The wavelength λ is twice the distance between two consecutive points of intersection I and I' of a sinusoid with the mean axis 71. The amplitude A is the distance from one crest 701 to the following crest 702 of a sinusoid. By undulation there is understood for the purposes of this invention any sinusoidal or sawtooth contour with or without clipped crests.

As can be seen, the amplitudes, wavelengths and spacings of the cables have values which are unusual as compared with known undulated cable plies.

The undulated cables can also be replaced by coil springs of, for instance, elliptical or rectangular section, the major axis or large side of which is parallel to the plane of the ply used. These springs are preferably made of steel wire. At least one ply of approximately parallel metal fibers (diameters from 0.1 to 1 mm; lengths of 5 to 20 mm) dispersed in a layer of rubber can also be used as protective screen.

What is claimed is:

1. A tire for aircraft, intended to support heavy loads and inflatable to high pressure, having a tread, a radial carcass reinforcement anchored to at least one bead ring in each bead and a crown reinforcement formed of at least two superimposed plies of extensible circumferential textile cables which is arranged radially outwards of the radial carcass reinforcement, characterized by the fact that the cables of the circumferential cable plies closest to the radial carcass reinforcement form an angle of 0°±2.5° from the circumferential direction of the tire, have a relative extensibility upon rupture of at least 8%, preferably between 10% and 26%, when the vulcanized tire is mounted on its service rim, but not yet inflated, and a relative contraction under the effect of the heat at the temperature of vulcanization of at least 1.25%, preferably between 2% and 8%.

2. A tire according to claim 1, characterized by the fact that the tread surface of the tire, mounted on its service rim, but not yet inflated, has a smaller radial curvature than the tread surface of the same tire when inflated to its service pressure.

3. A tire according to claim 1 or 2, characterized by the fact that the tread surface of the tire, mounted on its service rim but not yet inflated, has a negative radial curvature and a camber of concavity which is at least 10% greater than that of the mold.

4. A tire according to claim 1 or 2, characterized by the fact that the tread surface of the tire, mounted on its service rim but not yet inflated, is contracted in radial direction with respect to the tread surface of the same tire inflated to its service pressure.

5. A tire according to claim 1, characterized by the fact that the circumferential cable plies extend axially at least between the two shoulders of the tread.

6. A tire according to claim 1 or 5, characterized by the fact that the circumferential cable plies have axial widths which decrease radially towards the outside.

7. A tire according to claim 6, characterized by the fact that the axially widest circumferential cable ply extends from one edge to the other of the tread.

8. A tire according to claim 6, characterized by the fact that at least the axially widest circumferential cable ply has cables whose relative contraction under the effect of the heat at the temperature of vulcanization is less than that of the cables of the other circumferential cable plies.

9. A tire according to claim 1 whose crown reinforcement is further formed, radially to the outside of the circumferential cable plies, of at least two oblique plies of cables which are parallel in each ply and crossed from one ply to the next, characterized by the fact that the cables of the oblique plies from angles of between 30° and 90° with respect to the circumferential direction of the tire and are extensible and contract under the effect of the heat at the temperature of vulcanization.

10. A tire according to claim 9, characterized by the fact that the cables of the oblique plies have a low relative extensibility upon rupture and a high relative contraction under the effect of the heat at the temperature of vulcanization as compared with the extensibility and contraction of the cables of the circumferential cable plies.

11. A tire according to claim 9 or 10, characterized by the fact that the relative extensibility upon rupture of the cables of the oblique plies is smaller as the angle formed by said cables with the circumferential direction is larger and closer to 90°.

12. A tire according to claim 1 or 9, characterized by the fact that the cables of the radial carcass reinforcement are extensible and contract under the effect of the heat at the temperature of vulcanization.

13. A tire according to claim 1 or 9, characterized by the fact that the cables of the radial carcass reinforcement are practically without extensibility and contraction under the effect of the heat at the temperature of vulcanization.

14. A tire according to claim 1, characterized by the fact that radially outwards of the crown reinforcement there is arranged at least one ply of parallel cables undulated in the plane of the ply, the distance between the cables being between 50% and 100% of the crest-to-crest amplitude of the undulations, the wavelength of the undulations being between 100% and 200% of the crest-to-crest amplitude.

15. A tire according to claim 14, characterized by the fact that the mean axes of the undulations of these cables are oriented at 0° with respect to the circumferential direction of the tire.

16. A tire according to caim 14, characterized by the fact that the mean axes of the undulations of these cables are oriented at 90° with respect to the circumferential direction of the tire.

* * * * *